United States Patent Office 3,299,568
Patented Jan. 24, 1967

3,299,568
COMPOSITIONS PLASTICIZED WITH SULPHUR
Arthur V. Tobolsky, Princeton, N.J., and Masao Takahashi, Sonoyama, Otsu, Japan, assignors to Research Corporation, New York, N.Y., a nonprofit corporation of New York
No Drawing. Filed Mar. 1, 1966, Ser. No. 530,782
12 Claims. (Cl. 47—9)

This application is a continuation-in-part of Serial No. 271,856, filed April 10, 1963.

The present invention relates to plasticized polymeric compositions and more particularly to polymers plasticized with elemental sulphur.

Broadly stated, the invention is based on the discovery that elemental sulphur can be used as a plasticizer for certain polymeric systems. While elemental sulphur is generally in rhombic crystalline form at room temperature, it has been surprisingly found that by melting sulphur at a temperature of at least 118° C. (e.g. 150° C., or up to or even above the polymerization transition point), and admixing the molten sulphur with the polymer to be plasticized, the sulphur retains its liquid condition even when cooled to room temperature. The sulphur thus serves as a plasticizer and extender for the polymer which may be formed into highly desirable films and other useful products.

The polymer component used herein may comprise one or more polymers selected from the group consisting of linear and crosslinked polymeric polysulphides and hydrocarbon polymers. For reasonable solubility, the selected polymers should in general have solubility parameters close to that of elemental liquid sulphur. This characteristic can be readily determined for any particular polymer or polymer system under consideration by the method described in "Properties and Structure of Polymers" by A. V. Tobolsky, pages 65–66, John Wiley, N.Y. (1960).

Preferred hydrocarbon polymers for use herein include the polyolefins such as polyethylene, polypropylene, ethylene/propylene copolymers, polyisobutylene, and butyl rubber. Any of the available types of these polymers, e.g. high or low density polyethylene, may be used for present purposes.

As for the polymeric polysulphides, one preferred polymer is poly(ethylene tetrasulphide). The linear form of this polymer may be used herein but it is preferred to use the polymer in the crosslinked state. Linear poly(ethylene tetrasulphide) may be prepared by the interfacial polycondensation of ethylene dichloride and sodium tetrasulphide in an alkaline medium according to the following reaction:

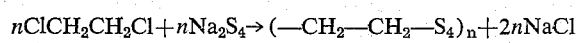

$n\text{ClCH}_2\text{CH}_2\text{Cl} + n\text{Na}_2\text{S}_4 \rightarrow (-\text{CH}_2-\text{CH}_2-\text{S}_4)_n + 2n\text{NaCl}$ This linear polymer may be plasticized with sulphur in the manner described herein. As the preferred alternative, however, crosslinking may be introduced into the polymer by the use of 1,2,3-trichloropropane or like trifunctional organic chloride or the equivalent in the polymerization reaction.

A detailed method of preparing crosslinked poly(ethylene tetrasulphide) for use herein is as follows:

To 210 cc. of a 40% aqueous solution of sodium polysulphide (sulphide rank 4.15) contained in a 1 litre resin flask the following were added consecutively with vigorous stirring: 1.37 ml. of 50% aqueous NaOH, 1.9 gm. of Asafoetida solution (which is a surfactant and effectively increases the concentration of reactants at the interface) and 10.9 gm. of 25% aqueous $\text{MgCl}_2\text{6H}_2\text{O}$. A fine precipitate of $\text{Mg(OH)}_2$ was prepared therefore in situ, and acted as a nucleating agent for the polycondensation.

At this stage the mixture was heated to 42° C. and a charge of ethylene dichloride—trichloropropane added over a period of 30 minutes. The proportion of trichloropropane in the mixture charged was 20% by weight. The rate of heating or cooling was adjusted so that by the end of this period the temperature had risen to 72° C. The total amount of organic chloride added was equivalent to 1 gm. atom.

The reactants were heated for one hour at 72° C. followed by one hour at 78° C., of 1½ hours at 78° C., for preparations containing higher percentages of 1,2,3-trichloropropane. This treatment produced a rubber latex which was washed repeatedly with water until the supernatant liquid became colorless. Coagulation of the latex was effected by reducing the pH to 4 with dilute sulphuric acid. The rubber crumb was well washed with water, filtered and dried in vacuo at 50° C. for fifteen hours.

Analysis gave: C=15.35%; H=2.42%; S=81.44%; Cl=1.13% and C=15.56%; H=2.52%; S=81.28%; Cl=1.03%; both sets of values comparing satisfactorily with calculated values. The low value for chlorine demonstrates that almost all of the trifunctional agent has reacted to form crosslinks. Oxygen, which would most probably arise from OH terminal groups, is undetected thus indicating that a crosslinked structure of very large molecular weight has been formed.

Various modifications may be made in the above described procedure for preparing a polysulphide polymer for use herein. Thus, for example, in lieu of ethylene dichloride, other difunctional halides may be used such as dichloro diethyl ether $\text{ClCH}_2\text{CH}_2\text{OCH}_2\text{CH}_2\text{Cl}$ or dichloro diethyl formal. In general, any compound containing two halogens or other functional substituents capable of being split off by reaction with polysulphide may be used. Additionally, any sodium polysulphide, e.g. the di- or tri-sulphide, may be used.

The crosslinking component may be any organic compound containing three or more halogens or other substituents capable of being split off by reaction with polysulphide, e.g. three or more halogen atoms. As indicated, 1,2,3-trichloropropane is the preferred crosslinking agent but alternatives include such compounds as $\text{ClCH}_2\text{CHCl}_2$ and $\text{ClCH}_2\text{CHClCH}_2\text{OCH}_2\text{CHClCH}_2\text{Cl}$. Other suitable crosslinking agents are shown in Patrick, U.S. Patent 2,466,963. This Patrick patent discloses the preparation of a crosslinked poly(ethylene tetrasulphide) polymer containing a low degree of crosslinking. Any of the materials and procedures mentioned in said patent may be used herein for preparation of the crosslinked polysulphide polymer.

Usually, in the preparation of the crosslinked polysulphide used herein, it is preferred, though not essential, to use the difunctional compound and crosslinking agent in amounts such that the total of these components is equivalent, on a mol basis, to the amount of sodium polysulphide. Advantageously, the polysulphide polymer is one with a high percentage of crosslinking, i.e. in the order of at least 10 and up to 50 crosslinks for each 100 repeating units of the polymer. This degree of crosslinking may be accomplished by using a mixture comprising, on a mol basis, 50–90% dihalide (or other difunctional compound) and 50–10% trihalide or equivalent crosslinking agent. The use of significantly less or more crosslinking agent than that indicated may give a useful product, but optimum properties are obtained when the degree of crosslinking is in the range indicated. As an illustration of the effect of crosslinking on the polymer properties, it may be mentioned that polyethylene tetrasulphide polymers containing less than 10% crosslinking, e.g. 2–5%, usually give mixtures with sulphur which are sticky at practical temperatures of use. On the other hand, polysulphide polymers containing more than the indicated degree of crosslinking, i.e. in excess of 50%, tend to be hard or brittle. This may limit the area of use although the property of hardness and/or brittleness may be advantageous under certain conditions. Surprisingly, best results are obtained with the 10–50% crosslinked polymer, the latter giving compositions which are rubbery and stable at normal temperatures for long periods of time and, therefore, have many practical areas of application, particularly in the preparation of films.

The amount of sulphur used for plasticizing the polymer used herein can be varied depending on the ultimate use, but should usually comprise at least 5%, and preferably at least 10%, by weight of the mixture of sulphur and polymer. The upper limit of sulphur depends on various factors including, in the case of the polysulphide polymers the amount of crosslinking in the polymer, higher sulphur contents being useable as the amount of crosslinking increases. Usually 60% is a practical upper limit on sulphur content, based on the total weight of sulphur and polymer, whether the polymer component comprises one or more polysulphides, polyolefins or mixture of the two. A sulphur content up to 50% by weight of the plasticized composition, the balance being essentially polyolefin and/or polysulphide, will generally give a composition which can be compression molded into stable rubbery films possessing highly desirable characteristics, e.g. flexibility and water-impermeability. On the other hand, the use of a higher sulphur content, e.g. 60% sulphur may give a film on compression molding which tends to crystallize over a prolonged period of time. This delayed crystallization and resulting brittleness make it possible to use polyolefin and/or polysulphide films obtained therefrom for agricultural mulch purposes. These films, e.g. a polyethylene film, may be laid over ground which has been planted to conserve water and heat during the early period of a plant's growth but by careful regulation of the amount of sulphur used for plasticizing, the film can be allowed to crystallize and thus disintegrate toward the end of the growing season to provide additional plant food. Time of disintegration can be controlled by regulating the amount of plasticizer in the order of 50–60% sulphur, by weight, based on the weight of plasticized composition, the polymer component comprising one or more polymeric polysulphides, polyolefins or mixtures of these two types of polymers. If desired, small amounts (e.g. up to 3%) of other materials, such as phosphorus or finely divided KCl may be incorporated in the film to increase the amount of plant food available at disintegration.

The plasticized compositions of the invention may be prepared by melting the sulphur at a temperature in the range of 118° C.–160° C. and thoroughly admixing the molten sulphur with the polymer in the selected proportions. This may be accomplished by simply bringing the polymer and sulphur together at room temperature and then heating the mixture above the melting point of the sulphur with stirring to obtain uniform admixture. The resulting composition may be compression molded or extruded into films or shaped products as may be desired. This is highly unusual because crosslinked polymers cannot generally be satisfactorily compression molded or extruded. Typical compression molding conditions include pressures of the order of 30,000 to 50,000 pounds per square inch for a period of 10 seconds to ten minutes and a temperature of 125° to 160° C.

The invention is illustrated, but not limited, by the following examples wherein parts are by weight unless otherwise indicated:

*Example 1*

70 parts by weight of poly(ethylene tetrasulphide) polymer prepared as described in the detailed method set forth above and containing 20% crosslinking were mixed together with 30 parts of pure sulphur and placed in a Pyrex glass tube. The tube was sealed off and heated in a silicone oil bath at 155° C. for one hour to obtain a homogeneous mixture. The resulting mixture was then compression molded into a film at 155° C. for about one minute. After molding, the film was quickly quenched between two Dry Ice blocks. The film was in a rubbery state and remained stable at room temperature over long periods of time. Extraction with carbon disulphide showed the sulphur to be in the monomeric form. The film was suitable for various uses e.g. as gasketing for solvents, wrapping and covering materials, sheeting, etc.

*Example 2*

60 parts by weight of crosslinked poly(ethylene tetrasulphide) containing 50% crosslinking, 34.7 parts of pure sulphur and 5.3 parts of phosphorous sesquisulfide (corresponding to 3.0 parts of phosphorous) were mixed together and placed in a Pyrex glass tube. The tube was evacuated and sealed off under high vacuum. The tube was then heated in a silicone oil bath at 130° C. for fifteen minutes to obtain a homogeneous mixture. The resulting mixture was then compression molded into a film at 130° C. for about thirty seconds. After molding, the film was quickly quenched between two Dry Ice blocks. The film was transparent, in rubbery state and remained stable at room temperature over long periods of time.

*Example 3*

Films of various polymers as shown in the table below were kept in liquid sulphur at 140° C. for ten hours under carbon dioxide atmosphere. These films became swollen with liquid sulphur. Weight gain (%) of these polymers is shown in the table:

| Polymer: | Weight gain (percent) |
| --- | --- |
| Polyethylene (high density) | 9.7 |
| Ethylene-propylene rubber | 8.1 |
| Polypropylene | 7.7 |
| Polyisobutylene | 5.8 |
| Butyl Rubber | 6.6 |

The weight gain represents the amount of liquid sulphur taken up by the polymers, the sulphur serving to plasticize or otherwise modify the characteristics of these polymers. The modification in some instances made the films tougher (polyisobutylene), more flexible or softer. The resulting products could be advantageously put to the normal uses of the unmodified films.

*Example 4*

60 parts by weight of pure sulphur and 40 parts by weight of powdered polyethylene (high density) were mixed together and placed in a Pyrex glass tube. The tube was evacuated and sealed off and heated in a silicone oil bath at about 160° C. for 10 hours to obtain a homogeneous mixture. The resulting mixture was then compression molded into a film at 160° C. for about one minute. After molding, the film was quickly quenched between two Dry Ice blocks. This film was found to be self-supporting and stable immediately after the molding but on storage for about a month crystallization occurred which caused the film to become brittle and break easily. These properties made the film useful as a self-degrading agricultural mulch.

*Example 5*

Example 4 was repeated except that 20 parts of the polyethylene were replaced by the crosslinked polysulphide polymer of Example 1 to give a somewhat softer, less brittle self-supporting film.

In addition to changing the mechanical properties of the films or other polymer forms, it will be recognized that the incorporation of sulphur has other effects which can be put to beneficial use. These include: change in the surface properties, change in the ultraviolet absorption and change in the oxidation characteristics of the polymers into which the sulphur has been incorporated.

It will be recognized that sulphur may be used in the manner described herein for plasticizing polyolefins, polymeric polysulphides or mixtures of the two. Thus, as shown, sulphur may be introduced into hydrocarbon polymers, e.g. polyethylene or polypropylene, in the amount of about 5-60% by weight or even higher, as desired, based on the weight of plasticized polymer, to give products which may be effectively extruded or molded into useful self-supporting films. The high sulphur content film (e.g. polyethylene film containing about 50-60% by weight sulphur) is particularly promising for use as a self-disintegrating agricultural mulch as described above. Relatively small amounts of other plant foods or additives may be incorporated into such a film. Other modifications may be made in the invention described herein. Hence, the scope of the invention is defined in the following claims wherein:

What is claimed is:

1. A polymer composition consisting essentially of a polymer selected from the group consisting of polyethylene and polyisobutylene, plasticized and modified with about 5 to 60% by weight of elemental sulphur.

2. A composition according to claim 1 wherein said polymer is polyethylene.

3. A self-supporting polyethylene film, said film containing from about 5 to 60% by weight elemental sulphur.

4. Film according to claim 3, said film containing 50-60% sulphur and being useful as a self-disintegrating agricultural mulch.

5. The method which comprises applying a polymer film as an agricultural mulch over ground which has been planted to conserve water and heat during plant growth, said film comprising a polymer selected from the group consisting of poly(ethylene tetrasulphide), polyethylene and polyisobutylene, including in said film sufficient elemental sulphur to cause said film to crystallize and disintegrate toward the end of the growing season to provide sulphur as additional plant food, and allowing said film to so crystallize and disintegrate.

6. The method of claim 5 wherein said polymer is polyethylene.

7. The method of claim 5 wherein said polymer film comprises, as an essential component, crosslinked poly-(ethylene tetrasulphide) containing 10-50% crosslinking and modified with elemental sulphur.

8. A polymer composition consisting essentially of poly(ethylene tetrasulphide) plasticized and modified with about 10% to 60% by weight of elemental sulphur.

9. The composition of claim 8 wherein said polymer is a crosslinked poly(ethylene tetrasulphide) containing from 10-50% crosslinking.

10. A self-supporting film comprising, as an essential component, the composition of claim 8.

11. A self-supporting film comprising, as an essential component, the composition of claim 9.

12. A self-supporting poly(ethylene tetrasulphide) film useful as a self-disintegrating agricultural mulch, said film containing from about 10-60% by weight elemental sulphur, the amount of elemental sulphur being such that said film crystallizes and becomes brittle on standing to provide said self-disintegrating characteristic.

References Cited by the Examiner

UNITED STATES PATENTS

| | | | |
|---|---|---|---|
| 2,245,500 | 6/1941 | Rein et al. | 260—30.8 |
| 2,961,799 | 11/1960 | Coe | 47—9 |
| 3,121,973 | 2/1964 | Phillips et al. | 47—9 |
| 3,127,379 | 3/1964 | Natta et al. | 260—30.8 |

OTHER REFERENCES

"How to use Polyethylene Film on your Farm," Monsanto Chem. Co., Plastics Division, Springfield, Massachusetts, 1959, pages 14 and 15.

Whitby: "Synthetic Rubber," John Wiley and Sons, Inc., New York, 1954, page 850.

MORRIS LIEBMAN, *Primary Examiner.*

B. A. AMERNICK, *Assistant Examiner.*